US007761600B2

(12) United States Patent
Terrill et al.

(10) Patent No.: US 7,761,600 B2
(45) Date of Patent: Jul. 20, 2010

(54) METHOD AND APPARATUS FOR DISTRIBUTING APPLICATION SERVER ADDRESSES IN AN IMS

(75) Inventors: Stephen Terrill, Madrid (ES); Bo Åström, Stockholm (SE); Hubert Przybysz, Hägersten (SE); Anders Ryde, Saltsjöbaden (SE); Stefan Berg, Bonn (DE)

(73) Assignee: Elefonaktiebolaget L M Ericsson (Publ), Stockholm (SE)

( * ) Notice: Subject to any disclaimer, the term of this patent is extended or adjusted under 35 U.S.C. 154(b) by 177 days.

(21) Appl. No.: 11/995,879

(22) PCT Filed: Aug. 15, 2005

(86) PCT No.: PCT/EP2005/054009

§ 371 (c)(1),
(2), (4) Date: Feb. 20, 2008

(87) PCT Pub. No.: WO2007/009498

PCT Pub. Date: Jan. 25, 2007

(65) Prior Publication Data

US 2008/0232352 A1     Sep. 25, 2008

Related U.S. Application Data

(60) Provisional application No. 60/700,683, filed on Jul. 19, 2005.

(51) Int. Cl.
*G06F 15/16*    (2006.01)

(52) U.S. Cl. ........................................ 709/245; 709/230
(58) Field of Classification Search .................. 709/245
See application file for complete search history.

(56) References Cited

U.S. PATENT DOCUMENTS

2005/0155036 A1*  7/2005  Tiainen et al. .............. 719/310
2006/0023657 A1*  2/2006  Woodson et al. ............ 370/328

FOREIGN PATENT DOCUMENTS

WO     WO 2005/064896 A     7/2005

OTHER PUBLICATIONS

3GPP: "IP Multimedia Subsystem Sh interface; Signalling Flows and Message Contents" 3GPP TS 29.328 V6.0, Jun. 2005, pp. 1-36, XP014031026 paragraphs [0001], [5.1.1], [05.2], [6.1.2], [7.6.1], [B.1.1]; figure B.1.1; table D.2.

* cited by examiner

*Primary Examiner*—Jeffrey Pwu
*Assistant Examiner*—Shripal K Khajuria (57) ABSTRACT

A method of distributing application server addresses in an IP Multimedia Subsystem. Upon allocation of an application server to a subscriber, the allocated or another application server sends at least one application server address to a Home Subscriber Server (HSS). The HSS stores the address(es) in association with the subscriber identity and sends the address (es) to a Serving Call/Session State Control Function (S-CSCF) allocated to the subscriber. The S-CSCF caches the address(es) in association with the subscriber identity and uses the address(es) to send subscriber-related messages to the allocated application server.

10 Claims, 6 Drawing Sheets

METHOD AND APPARATUS FOR DISTRIBUTING APPLICATION SERVER ADDRESSES IN AN IMS

This application claims the benefit of U.S. Provisional Application No. 60/700,683, filed Jul. 19, 2005, the disclosure of which is fully incorporated herein by reference.

FIELD OF THE INVENTION

The present invention relates to a method and apparatus for distributing application server addresses in an IP Multimedia Subsystem and more particularly to a method and apparatus for distributing application server addresses for dynamically allocated application servers.

BACKGROUND TO THE INVENTION

IP Multimedia services provide a dynamic combination of voice, video, messaging, data, etc. within the same session. By growing the number of basic applications and the media which it is possible to combine, the number of services offered to the end subscribers will grow, and the inter-personal communication experience will be enriched. This will lead to a new generation of personalised, rich multimedia communication services, including so-called "combinational IP Multimedia" services.

IP Multimedia Subsystem (IMS) is the technology defined by the Third Generation Partnership Project (3GPP) to provide IP Multimedia services over mobile communication networks (3GPP TS 22.228, TS 23.228, TS 24.229, TS 29.228, TS 29.229, TS 29.328 and TS 29.329 Releases 5 to 7). IMS provides key features to enrich the end-subscriber person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between subscriber terminals (or subscriber terminals and application servers). The Session Description Protocol (SDP), carried by SIP signaling, is used to describe and negotiate the media components of the session. Whilst SIP was created as a subscriber-to-subscriber protocol, IMS allows operators and service providers to control subscriber access to services and to charge subscribers accordingly.

Figure 1:
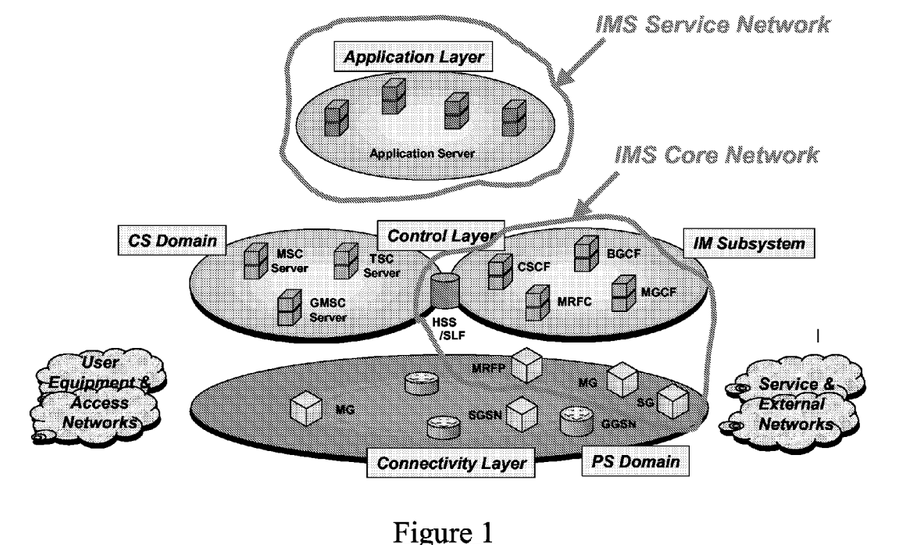
FIG. 1 illustrates schematically the integration of an IP Multimedia Subsystem into a 3G mobile communications system.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the subscriber that the subscriber is subscribed to; and the Interrogating CSCF (I-CSCF) whose role is to identify the correct S-CSCF and to forward to that S-CSCF a request received from a SIP terminal via a P-CSCF.

A subscriber registers with the IMS using the specified SIP REGISTER method. This is a mechanism for attaching to the IMS and announcing to the IMS the address at which a SIP subscriber identity can be reached. In 3GPP, when a SIP terminal performs a registration, the IMS authenticates the subscriber, and allocates a S-CSCF to that subscriber from the set of available S-CSCFs. Whilst the criteria for allocating S-CSCFs is not specified by 3GPP, these may include load sharing and service requirements. It is noted that the allocation of an S-CSCF is key to controlling (and charging for) subscriber access to IMS-based services. Operators may provide a mechanism for preventing direct subscriber-to-subscriber SIP sessions which would otherwise bypass the S-CSCF.

During the registration process, it is the responsibility of the I-CSCF to select an S-CSCF if a S-CSCF is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a subscriber by the I-CSCF in the case where the subscriber is called by another party, and the subscriber is not currently allocated an S-CSCF.] When a registered subscriber subsequently sends a session request to the IMS, the P-CSCF is able to forward the request to the selected S-CSCF based on information received from the S-CSCF during the registration process.

Within the IMS service network, Application Servers (ASs) are provided for implementing IMS service functionality. Application Servers provide services to end-subscribers in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from an HSS during the IMS registration procedure as part of a subscriber's Subscriber Profile.

Figure 2:
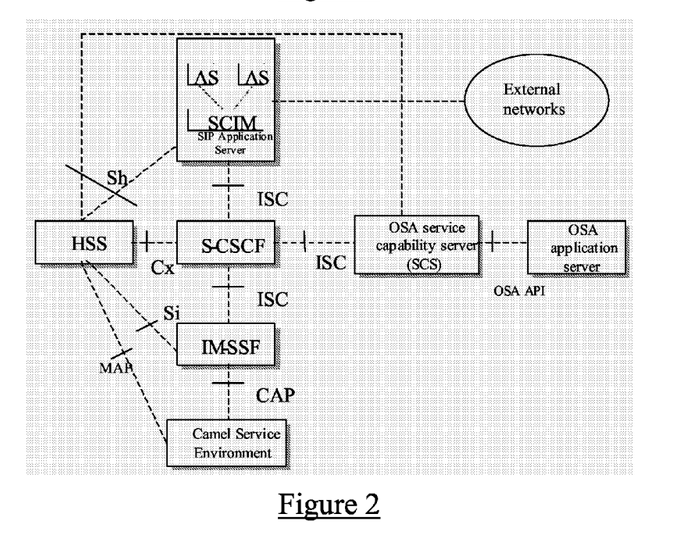
FIG. 2 illustrates schematically certain entities of the IP Multimedia Subsystem including an Application Server and a Serving Call/State Control Function.

FIG. 2 illustrates the IMS Service Control (ISC) interface between an AS and an S-CSCF, as well as other interfaces within the IMS. Although the AS in FIG. 2 is shown as having only a single interface to an S-CSCF, it will be appreciated that in practice the ISC interface will extend across a communication network to which many (or all) of the CSCF servers of a given operator's network are connected, allowing an AS to communicate with all of these CSCFs. [Other entities illustrated in FIG. 2 will be well known to those of skill in the art.]

A further interface (Ut) exists between the AS and the subscriber terminal (TS23.002) although this is not shown in the Figure. The Ut interface enables the subscriber to manage information related to his or her services, e.g. creation and assignment of Public Service Identities, management of authorisation policies that are used for example by "presence" services, conference policy management, etc.

In the IMS as defined in 3GPP, whilst subscribers are statically allocated to an HSS, it is the ASs that provide specific value in the case of services provided by the network. A reading of the 3GPP specification in Releases 5 and 6 suggests that subscribers are allocated to particular SIP ASs in a fixed manner. The basic concept is that a subscriber is provisioned to be supported by a specific SIP AS application server for a given service or services. In order to enable the allocated S-CSCF to reach the allocated AS over the ISC interface, the filter criteria (contained within the IFC sent to the S-CSCF from the HSS) for that subscriber for that service contains either a fully qualified domain name (FQDN) or IP address as the destination address (encoded as a SIP-URI). This implies, for example, that when the S-CSCF identifies that a particular INVITE should be routed to an AS, the S-CSCF is provided with the address of the specific AS over via the Cx interface. In order to identify the correct AS for other interfaces, e.g. such as the Ut interface between the subscriber terminals and the SIP-ASs, routing proxies are provisioned with the address of the AS for the particular subscriber. Where subscribers are allocated to specific ASs, then either the terminal is configured with the address of the AS for that interface and service, or the terminal sends the request to an entity that knows how to retrieve the address of the AS for that subscriber. A "front end" could do this and, in such a case, the routing functionality would be configured into the front end.

SUMMARY OF THE INVENTION

As will be clear from the above discussion, the existing proposal for the allocation of ASs to subscribers requires the provisioning of a subscriber to a specific SIP application server for a given service or set of services. This requires a high level of availability and persistent storage of data on the ASs as, if a single ASs becomes temporarily unavailable or does not retain the appropriate information, the provisioned service(s) will be unavailable to the subscribers to whom the AS is allocated. Adopting this approach may require the building-in of redundancy to each AS.

It is possible to introduce a dynamic approach to the allocation of ASs to subscribers. For example, some means may be provided for allowing a S-CSCF to select an application server from a set of available ASs upon receipt of a SIP register request from a subscriber, or upon receipt of a call termination request for an unregistered subscriber. However, such an approach may give rise to conflicts in the event that an AS is allocated to a subscriber as a result of some other process. In particular, one might consider the situation where an AS is allocated to a subscriber as a result of a subscriber request sent to the IMS over the Ut interface. When a subsequent register (or call termination) request is received at the S-CSCF, unless the S-CSCF is made aware of the previous AS allocation, an inefficient use of resources is likely to result.

According to a first aspect of the present invention there is provided a method of distributing application server addresses in an IP multimedia subsystem, the method comprising:

upon allocation of an application server to a subscriber, sending an application server address or addresses from the allocated application server or other application server to a Home Subscriber Server;

storing the received address(es) at the Home Subscriber Server in association with the subscriber identity;

sending the address(es) from the Home Subscriber Server to Serving/Call State Control Function allocated to the subscriber; and caching the received address(es) at the Serving/Call State Control Function in association with the subscriber's identity, wherein the Serving/Call State Control Function uses the received address(es) to send subscriber related messages to the allocated application server.

The term "application server" as used here encompasses conventional SIP application server as well as other servers that have a SIP interface.

The method of the above first aspect of the invention may be carried out in response to one of the following events:

1. receipt at the Serving/Call State Control Function of a SIP register request from said subscriber;
2. receipt at the Serving/Call State Control Function of a call termination request for said subscriber and where said subscriber is unregistered; and
3. receipt at an application server of a request from said subscriber over a non-ISC interface, e.g. the Ut interface.

Of course, triggering of the inventive method by other SIP methods is not excluded.

In the case of 1. and 2. above, receipt of the register or call termination request at the Serving/Call State Control Function may cause the Serving/Call State Control Function to forward the request to the allocated application server or said other application server. Receipt of the request at one of these application servers causes the receiving application server to perform said step of sending an application server address or addresses to the Home Subscriber Server.

Receipt at the Serving/Call State Control Function of a register or call termination request may cause the Serving/Call State Control Function to request from the Home Subscriber Server an allocated application server address, i.e. a Cx user profile retrieval procedure. In the event that an explicit address has been allocated, this is sent to Serving/Call State Control Function. In the event that no explicit address has been allocated, the Home Subscriber Server may forward to the Serving/Call State Control Function a generic application server identity. In this case, the Serving/Call State Control Function resolves the generic identity to one of a plurality of explicit addresses, e.g. IP addresses or Fully Qualified Domain Names, and selects one of the explicit addresses. The register or call termination request is sent to this address, after which the steps of the first aspect are performed.

In the case of 3. above, receipt of a request at an application server may cause that application server to send a query to the Home Subscriber Server to determine whether or not an application server has already been allocated to the subscriber. If so, the receiving application server will forward the request to the allocated application server after having received its address from the Home Subscriber Server (if the allocated server is not itself). If no application server has been allocated, the receiving application server will a) store its own address(es) in the Home Subscriber Server, b) forward the request to another application server and cause the address(es) of that other application server to be stored in the Home Subscriber Server, or c) forward the request to another application server and allow that other application server to store its address(es) in the Home Subscriber Server.

Preferably, said application server address or addresses are sent to the Home Subscriber Server via the Sh interface. Alternatively however, other protocols may be used.

According to a second aspect of the invention there is provided an application server for use in distributing application server addresses in an IP multimedia subsystem, the application server comprising means for sending an application server address or addresses to a Home Subscriber Server upon allocation of the application server, or another application server to a subscriber.

Advantages of embodiments of the present invention include:

The separation of the subscriber data from the processing logic. This reduces the requirements on persistent storage of data on the nodes that perform the execution of the application logic, and makes it easier to re-allocate subscribers amongst nodes.

The dynamic allocation of subscribers to SIP-ASs increases the system availability by allowing a subscriber to be allocated to another node in the event of a node outage.

The dynamic allocation of subscribers to application servers is possible whilst still allowing allocation as a result of user activity over non-ISC interfaces, e.g. Ut, OSA, etc.

The solution separates the dynamic allocation of subscribers to ASs from IMS procedures, i.e. the allocation is decoupled from the registration and terminating call procedures and users can remain allocated to an AS even if they are deregistered from the IMS. The next time a user registers, the IFC will contain the address of the allocated AS and not the generic name of the service. This minimizes signalling in the core network and the transfer of user data over the Sh interface.

DETAILED DESCRIPTION OF CERTAIN EMBODIMENTS

The 3GPP Technical Standards referenced above describe the use of initial filter criteria (IFC), which are stored in the HSS, and which are sent to a Serving Call/Session Control Function (S-CSCF) node either upon registration of a subscriber or when a terminating call is made to an unregistered subscriber. Conventionally, an IFC for a subscriber contains a specific SIP Application Server (AS) address, e.g. as a Fully Qualified Domain Name (FQDN). This identifies the AS that is allocated to that subscriber for a given service. [It is possible for an IFC to contain two or more AS addresses corresponding to respective IMS services.] If the AS address in the IFC is a SIP-URL, a DNS is used to resolve the SIP-URL to an IP address. The S-CSCF may cache the association between the specific SIP-AS address and the IP address for reasons of efficiency. This caching is typically in the DNS client of the S-CSCF of the system and is cached on a per-node basis, not on a per subscriber basis.

The following discussion assumes, by way of example, that a flexible and dynamic approach to SIP-AS allocation is used. This involves replacing the specific AS address stored at the Home Subscriber Server (HSS) with a generic AS identity, e.g. SIP-AS.operator.com, in the event that a dynamic SIP-AS allocation has not already been completed. The generic identity identifies a predefined group of ASs, all of which are capable of providing a given IMS service. In particular, the initial filter criteria (IFC) which is stored in the HSS, is provisioned with a generic name of an application server, e.g. SIP-AS.operator.com. At registration of a subscriber—or upon call termination for an unregistered subscriber—the IFC is downloaded to the S-CSCF across the Cx interface in accordance with the procedures described in 3GPP TS 23.228; 3GPP TS 29.228 and 3GPP TS 29.229. The generic identity of the SIP-AS is resolved to either a specific name, e.g. SIP-AS1. operator.com, which is further resolved to an IP address, or the generic identity is resolved directly to a number of IP addresses. Existing DNS methods are used for the resolution process. [In the case where the generic identity is resolved to a specific name which is further resolved to an IP address, two round trips between the S-CSCF and the DNS are required.] The IFC triggers the provision of a third party registration message, i.e. a SIP REGISTER message, by the S-CSCF to the selected SIP-AS. The S-CSCF does not cache the association between the subscriber and the selected AS address at this stage.

The specific SIP-AS which receives the third party registration message, dynamically allocates the subscriber to itself and becomes a Serving-AS for that subscriber. It checks whether or not it retains required subscriber data for the subscriber and, if not, retrieves this data from the HSS over the Transparent or Non-Transparent Sh (and/or possibly from some other persistent subscriber data repository). The Serving-AS explicitly pushes its addresses into the HSS over the Sh interface (over the Non-Transparent interface or, possibly, the Transparent interface) to register itself as the Serving-AS for the subscriber.

This pushed address may be accompanied by the corresponding generic identity to allow for the case where multiple generic identities are recorded at the HSS for a given subscriber (in the following examples it is assumed that the HSS records only a single generic identity for each subscriber). This address unequivocally identifies the particular Serving-AS and can be a specific name, e.g. SIP-AS-12345. operator.com, or an IP address of the server. The HSS in turn pushes the address of the Serving-AS to the S-CSCF hosting the subscriber over the Cx interface. The S-CSCF takes this push message as an explicit instruction to use the pushed address from that point on, when forwarding SIP requests based on the IFC for the subscriber in question.

This approach avoids the assumption (at the S-CSCF) that the SIP AS corresponding to the initially resolved IP address is the AS that handled the initial request. This might not be the case, for example, where the AS receiving the initial request from the S-CSCF forwards the request to another AS for processing. According to the approach described here, that second AS would be the one that pushes its address into the HSS over the Sh interface to register itself as the Serving-AS for the subscriber.

The explicit address push mechanism described here is not limited to SIP-AS allocation at the time of registration and at the time of handling terminating requests for unregistered subscribers. Using this mechanism, a SIP-AS may register itself as the serving SIP-AS for the subscriber at any time, e.g. as a result of an operation on the Ut or other interface, or of some administrative operation. In other words, the solution separates the Dynamic Allocation of subscribers to ASs from IMS procedures: the allocation is decoupled from the registration and terminating call procedures and users can remain allocated to an AS even if they are deregistered from IMS A few detailed examples will now be considered to further illustrate the inventive principles. These relate firstly to procedures initiated over the ISC interface, and then to procedures initiated over the Ut interface.

ISC Initiated Procedures

SIP-AS Allocation at Subscriber Registration

Figure 3:
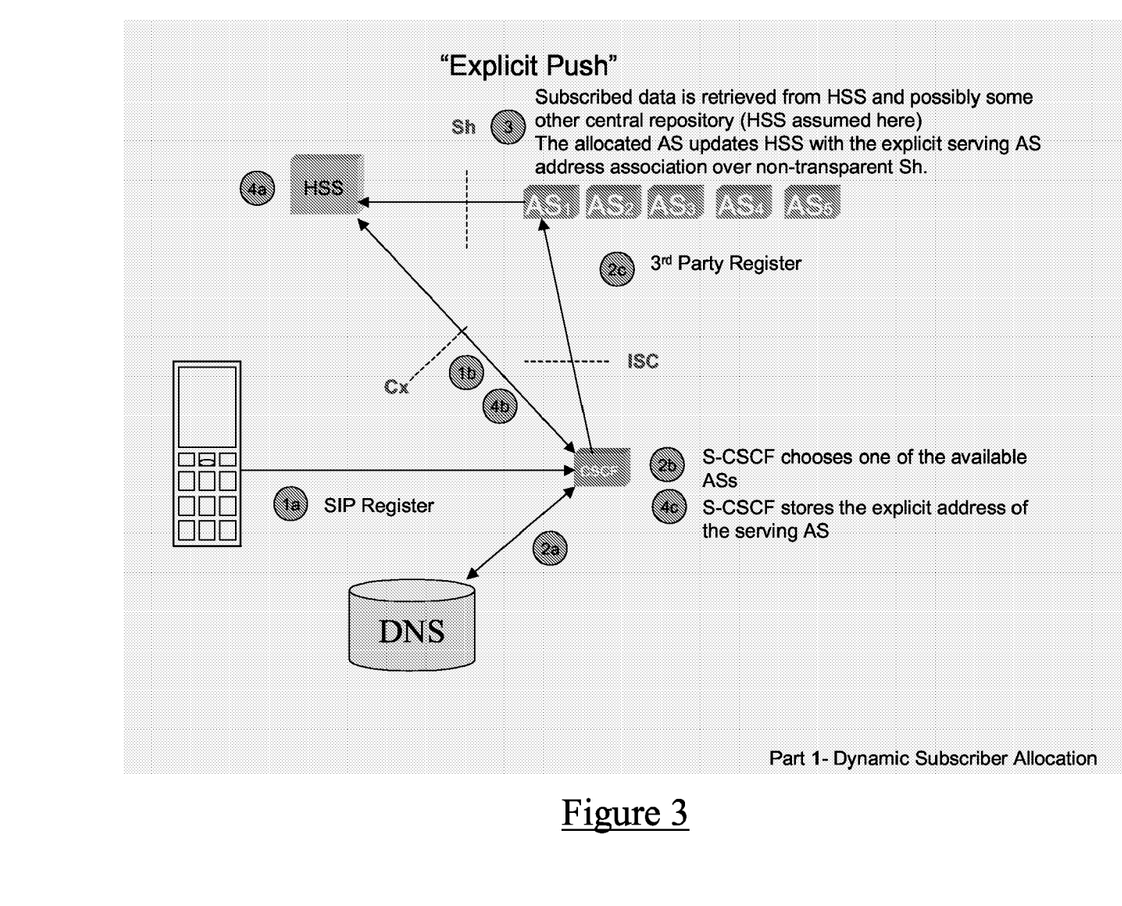
FIG. 3 illustrates schematically a procedure for explicitly pushing an application server address to an S-CSCF within an IMS.

With reference to FIG. 3, the SIP-AS allocation procedure will now be described in the context of a SIP registration for a particular subscriber. The steps of this procedure are as follows, with the step numbering corresponding to the numbering used in the Figure. This sequence assumes that no serving application server is allocated to the subscriber prior to registration.

1a. A subscriber terminal initiates a SIP REGISTRATION process by sending a SIP REGISTER message to the S-CSCF.

1b. During the registration process the subscriber service profile is downloaded from the HSS. This contains the initial filter criteria (IFC) with a related generic identity of the application server. [NB. It is assumed here that the IFC contains only a single, generic identity although this need not be the case.]

2abc. After completing the registration process with the HSS, the S-CSCF knows that it must perform a third party REGISTRATION with the named AS. The S-CSCF 2 requests an IP address for the generic AS from a DNS server 4. The DNS server 4 responds with a number of IP addresses corresponding to respective, available ASs ($AS_1$ to $AS_5$). The S-CSCF 2 selects one of the returned addresses to forward the REGISTER message to—selection may be based upon a round-robin selection, weighted according to a priority allocated by the DNS—and the third party register message is sent to the selected AS. The S-CSCF does not need to remember the subscriber/AS address association at this stage.

[If the receiving AS determines that some other AS must process the request, the request will be forwarded onto that other AS and it will become the allocated AS.]

3. Upon receiving the third party registration, the allocated AS performs the following:

It retrieves the application specific subscriber data from the HSS.

It stores its explicit address for the subscriber in relation to the generic application server identity, i.e. the identity previously provided to the S-CSCF, in the HSS in the non-transparent subscriber service profile data.

The AS indicates that it wishes to be informed of changes to the subscriber data.

It is noted that, whilst in this example the HSS is the central repository for the AS address and subscriber data, some other central repository may be used instead. This could be a database coupled to a set of ASs that implement an IMS service or be generic for all ASs in an operator's/service provider's domain.

4a The HSS identifies a change in the subscriber service profile due to the AS storing its explicit address and decides to update the S-CSCF.

4b The HSS updates the subscriber profile in the S-CSCF over the Cx interface. The subscriber profile carries the explicit address of the allocated serving AS.

4c The S-CSCF stores the updated subscriber profile with the explicit address of the allocated serving AS.

The transparent data on the Sh interface could be used as a means to store the subscriber data in a centralised manner. This is what is assumed in this discussion, however it is not essential, and it is possible that another data repository is used to store the subscriber data.

Upon completion of the process described, a SIP-AS has been selected for the subscriber. The SIP-AS has retrieved a copy of the application specific subscriber data the subscriber. The S-CSCF has received and stored the address of the SIP-AS allocated for that subscriber.

During a subsequent de-registration of the subscriber, the SIP-AS may de-register itself and remove the stored AS address from the HSS. However, in order to separate the Dynamic Allocation of subscribers to ASs from IMS procedures, i.e. to allow users to remain allocated to an AS even if they are deregistered from IMS, this need not be the case.

It is possible that a SIP AS will already have been allocated to the subscriber, prior to SIP registration. This might happen as a result of SIP AS allocation due to receipt of a request over a non-ISC interface, or due to earlier termination of a call for an unregistered subscriber, or due to retention of data at the HSS after de-registration. In such cases, the IFC retrieved by the S-CSCF from the HSS may include the explicit address for the already allocated AS. It is also possible that, following allocation of a SIP-AS, that AS will not be reachable by the S-CSCF. Provision may therefore be made to allow the S-CSCF to select a different AS address from the set of addresses returned by the DNS.

Originating or Terminating Procedures for a Registered Subscriber

Figure 4:
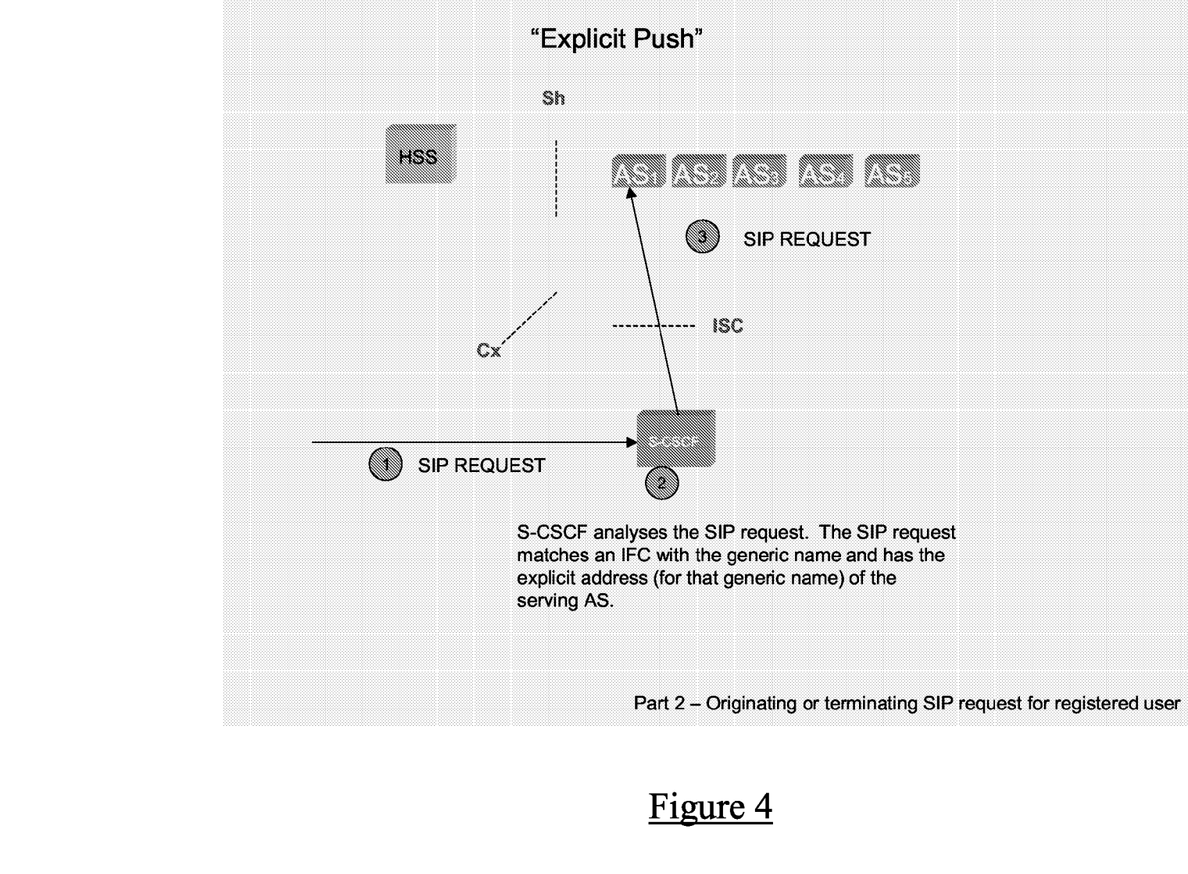
FIG. 4 illustrates schematically a procedure for handling originating and terminating calls within an IMS for a registered subscriber.

With reference to FIG. 4, the procedure carried out for originating or terminating calls from or to a subscriber registered using the process described above, will now be described. The procedure requires the following steps:

1. A SIP request for the subscriber is received at the S-CSCF.

2. The S-CSCF analyses the SIP request and matches it against the IFC in the subscriber's profile (previously provided to it by the HSS). Once an IFC is matched, this IFC points to the generic name of the AS and in turn to the related explicit address of the serving AS. The S-CSCF has received the explicit address for this subscriber during registration.

3. The SIP request is sent to the explicit address of the serving SIP-AS. The SIP-AS has a copy of the application specific data for the subscriber from the registration process, and proceeds to process the SIP request.

Terminating Procedure for an Unregistered Subscriber

Figure 5:
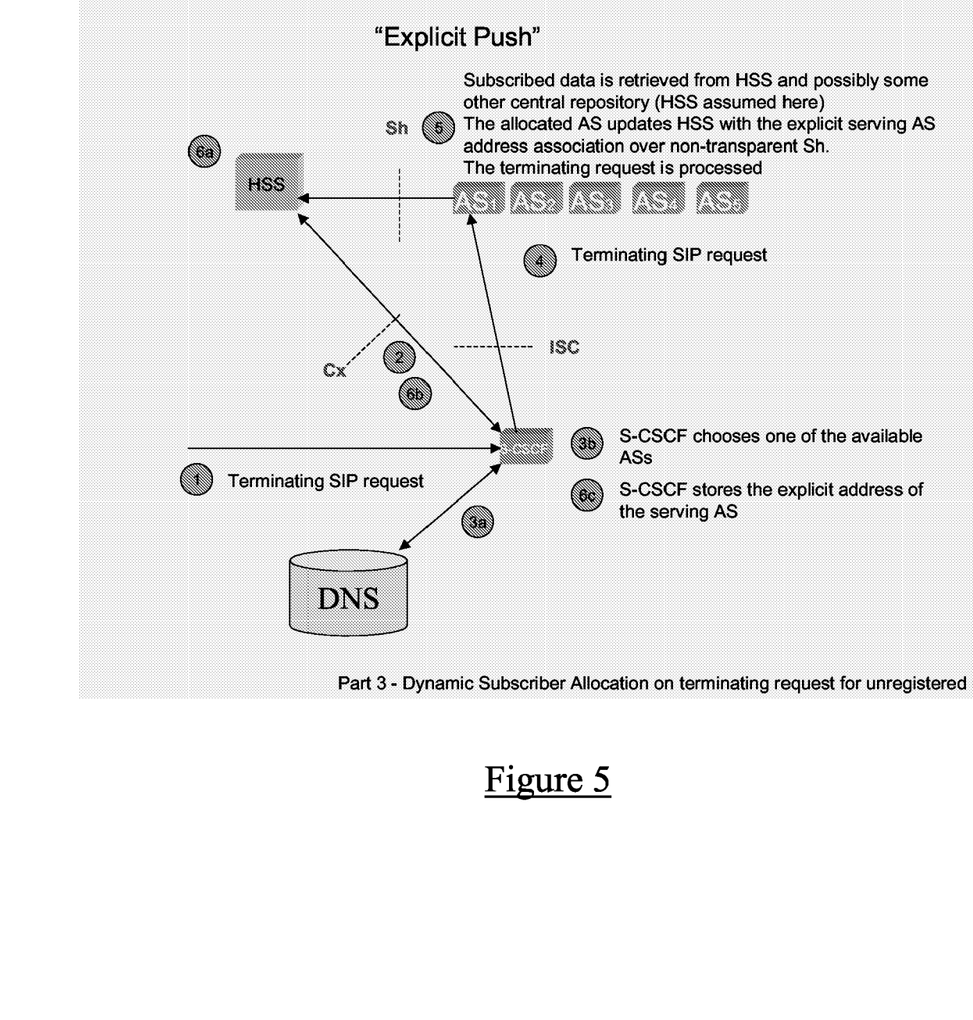
FIG. 5 illustrates schematically a procedure for handling terminating calls within an IMS for an unregistered subscriber.

With reference to FIG. 5, the procedure carried out for terminating calls to an unregistered subscriber will now be described. In such a scenario, the SIP-AS does not have the subscriber data when the terminating request is received. The procedure requires the following steps:

1. The S-CSCF receives a terminating SIP request.

2. The subscriber service profile is downloaded from the HSS to the S-CSCF. This profile contains the initial filter criteria with related generic identity of the application server.

3a. The S-CSCF analyses the SIP request. Once an IFC is matched it will point to the generic name of the AS for which there is no related explicit address of a serving application server. The S-CSCF resolves the generic name and requests the IP address from a DNS server. The DNS server responds back with a number of addresses.

3b. The S-CSCF selects one of the returned addresses to forward the terminating SIP request to.

4. The terminating SIP request is forwarded to the selected SIP-AS.

5. Upon receiving the terminating SIP request, the AS performs the procedures set out in step 3 above with reference to FIG. 4.

6a. The HSS identifies a change in the subscriber service profile due to the AS storing its explicit address and decides to update the S-CSCF 6b. The HSS updates the subscriber profile in the S-CSCF over the Cx interface. The subscriber profile carries the explicit address of the allocated serving AS.

6c. The S-CSCF stores the updated subscriber profile with the explicit address of the allocated serving AS.

During de-registration of the subscriber, the SIP-AS may or may not de-register itself and remove the stored AS address from the HSS. In the case that the AS address is retained by the HSS, during any subsequent register procedure, the HSS will supply the explicit address to the S-CSCF.

Ut Initiated Procedures

It is possible for a subscriber to initiate some action, for example a change to data and features of a particular IMS service, by sending a request to an AS over a non-ISC interface, e.g. over the Ut interface. Such an action may be carried out in some cases where the subscriber is not yet registered with the IMS. Rather than being directly received by the AS, these requests may be received by some "intermediate" application such as an XML Document Management Server (XDMS) Front End which is co-located with a particular AS. The address of Front End might be prestored at the terminal as a default address for the Ut interface. The XDMS Front End should forward the message to the XDMS on the AS that has been allocated to the subscriber. (i.e. as part of a previous registration or terminating call process).

If a request is received over the UT interface prior to allocation of an AS to a subscriber, AS selection must be performed in response to that request. The XDMS front end will look up the address of the serving AS over the Sh interface, and will determine that no serving SIP-AS address is stored. The XDMS front end will then select a SIP-AS and forward the request to the SIP-AS. The SIP-AS will retrieve the subscriber data from the HSS, and if it decides to register itself as a serving SIP AS for that subscriber, will store its explicit address in the subscriber service profile in the HSS and proceed to process the request. This will trigger a subscriber profile update from the HSS to the S-CSCF if an S-CSCF is allocated for the subscriber.

Request Received over Ut Interface where an AS has been Allocated

Figure 6:
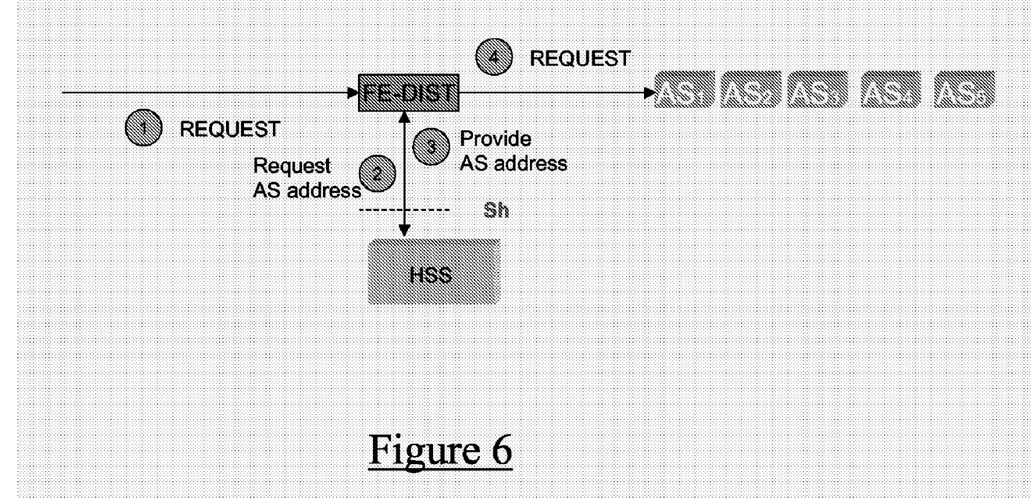
FIG. 6 illustrates schematically a procedure for handling requests received over a non-ISC interface for a subscriber registered with an IMS.
Figure 7:
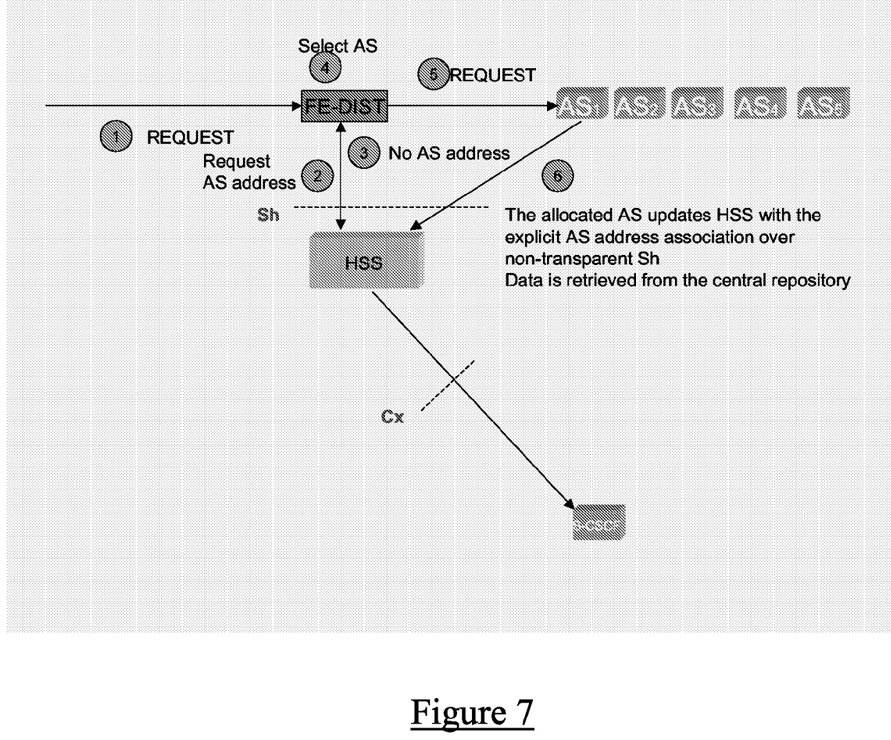
FIG. 7 illustrates schematically a procedure for handling requests received over a non-ISC interface for a subscriber not registered with an IMS.

Considering in more detail the procedures followed where a user request is received over a non-ISC interface such as the Ut interface, the case where an AS has already been allocated is handled as follows (FIG. 6):

1. A request is received over the particular interface. The request is terminated on a "Front end distributor" (FE-DIST) for the service represented by that front end.
2. The FE-DIST requests the AS address from the HSS over the Sh interface.
3. The explicit AS address is returned over the Sh to the FE-DIST.
4. The Request is forwarded to the explicit address and the XDMS on the serving AS Request Received over Ut Interface where an AS has not been Allocated The case where an AS has not already been allocated is handled as follows (FIG. 7):

1. A request is received over the particular interface. The request is terminated on a FE-DIST for the service represented by that front end.
2. The FE-DIST requests the AS address from the HSS over the Sh interface.
3. An indication that no AS has been allocated is returned.
4. The FE-DIST selects an AS (it may use other databases to obtain the names of valid ASs).
5. The request is forwarded to the selected AS and the XMDS.
6. The selected AS performs the following:
   The SIP-AS may choose to register itself as the serving AS for the subscriber and if it does it will store its explicit address in the HSS. [This may not be required if the transaction is to occur only once and it is not expected that there will be subsequent requests.]
   Read the application specific subscriber data from the central data storage.
   Process the request.

It will be appreciated by the person of skill in the art that various modifications may be made to the above described embodiments without departing from the scope of the present invention. For example, it is possible that for a given SIP service, two SIP-AS may be required, in which case two explicit SIP-AS addresses will be pushed to the S-CSCF.

The invention claimed is:

1. A method of distributing application server addresses in an IP multimedia subsystem, the method comprising the steps of:
    receiving a Session Initiation Protocol (SIP) request associated with a subscriber at a Serving Call Session Control Function (S-CSCF), the SIP request including a subscriber identity;
    in response to receiving the SIP request at the S-CSCF, selecting an application server by the S-CSCF and forwarding the SIP request to the selected application server;
    in response to receiving the SIP request at the selected application server, dynamically allocating the subscriber to the selected application server and sending the subscriber identity and at least one application server address from the selected application server to a Home Subscriber Server (HSS) associated with the subscriber thereby registering as the subscriber's serving application server;
    in response to receiving the at least one application server address at the HSS, storing the at least one address at the HSS in association with the subscriber identity for responding to future subscriber-related messages;
    sending the at least one application server address from the HSS to the S-CSCF, wherein if an explicit address has been allocated, the allocated explicit address is sent to the S-CSCF by the HSS, and if no explicit address has been allocated, the HSS sends to the S-CSCF a generic application server identity and the S-CSCF resolves the received generic identity to one of a plurality of explicit addresses; and
    caching the at least one address at the S-CSCF in association with the subscriber identity, wherein the S-CSCF utilizes the at least one address to send subscriber-related messages to the allocated application server.

2. The method according to claim 1, wherein said SIP request is one of:
    a) a SIP register request from said subscriber; and
    b) a call termination request for said subscriber and where said subscriber is unregistered.

3. The method according to claim 1, wherein the at least one application server address is sent from the application server to the HSS via an Sh interface.

4. The method according to claim 1, wherein said step of sending the at least one address from the HSS to an S-CSCF allocated to the subscriber includes updating Initial Filter Criteria at the S-CSCF over a Cx interface.

5. An application server for distributing application server addresses in an IP multimedia subsystem, the application server comprising:
    communication means for receiving an indication from a Serving Call Session Control Function (S-CSCF) that the S-CSCF has selected the application server to serve a subscriber having a subscriber identity;

means responsive to receiving the indication, for dynamically allocating the subscriber to the application server; and means for registering as the subscriber's serving application server by sending the subscriber identity and at least one application server address to a Home Subscriber Server (HSS) associated with the subscriber upon allocation of the application server to the subscriber;

wherein if an explicit address has been allocated, the allocated explicit address is sent to the S-CSCF by the HSS, and if no explicit address has been allocated, the HSS sends to the S-CSCF a generic application server identity and the S-CSCF resolves the received generic identity to one of a plurality of explicit addresses.

6. A method of distributing application server addresses in an IP multimedia subsystem, the method comprising the steps of:

receiving at an application server, a request from a subscriber, the request including a subscriber identity;

in response to receiving the request, allocating the application server or another application server to said subscriber;

sending at least one application server address from the allocated application server or other application server to a Home Subscriber Server (HSS) associated with the subscriber;

in response to receiving the at least one application server address at the HSS, storing the at least one application server address at the HSS in association with the subscriber identity for responding to future subscriber-related messages;

sending the at least one address from the HSS to a Serving Call Session Control Function (S-CSCF) allocated to the subscriber, wherein if an explicit address has been allocated, the allocated explicit address is sent to the S-CSCF by the HSS, and if no explicit address has been allocated, the HSS sends to the S-CSCF a generic application server identity and the S-CSCF resolves the received generic identity to one of a plurality of explicit addresses; and caching the at least one address at the S-CSCF in association with the subscriber's identity, wherein the S-CSCF utilizes the at least one address to send subscriber-related messages to the allocated application server.

7. The method according to claim 6, wherein receipt of a request at an application server causes that application server to send a query to the HSS to determine whether or not an application server has already been allocated to the subscriber.

8. The method according to claim 7, wherein, if an application server has been allocated, the receiving application server forwards the request to the allocated application server after having received the address of the allocated server from the HSS if the allocated server is not the receiving application server.

9. The method according to claim 7, wherein, if no application server has been allocated, the method further comprises sending the address of the receiving application server from the receiving application server to the HSS.

10. The method according to claim 7, wherein, if no application server has been allocated, the method further comprises forwarding the request from the receiving application server to another application server, the request causing the other application server to send its address to the HSS.

* * * * *